May 8, 1928. 1,669,395
E. GUTTMANN
INSTRUMENT FOR TAKING SAMPLES OF SECRETIONS
Filed Aug. 7, 1925
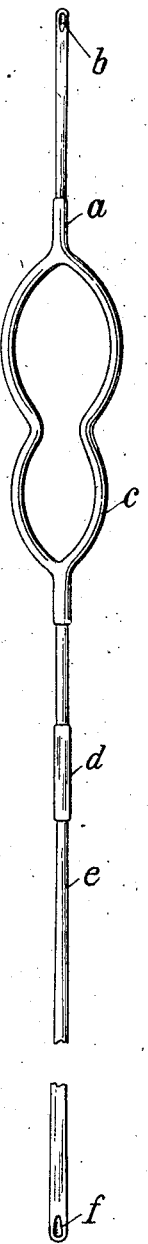
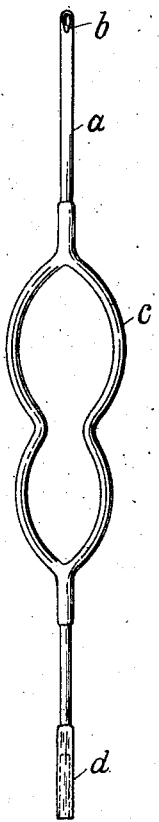

Patented May 8, 1928.

1,669,395

UNITED STATES PATENT OFFICE.

EUGEN GUTTMANN, OF BERLIN-CHARLOTTENBURG, GERMANY.

INSTRUMENT FOR TAKING SAMPLES OF SECRETIONS.

Application filed August 7, 1925, Serial No. 48,896, and in Germany August 22, 1924.

For taking samples of secretions from the urethra and the cervix an eye of platinum wire is generally used. This instrument is however very imperfect as it permits only of taking a quite small quantity of secretion from one point of the mucous membrane.

This invention has for its object to create an improved instrument comprising at each end a spoonlike cavity and adapted to be conducted along the whole mucous membrane in exerting at the same time a slight pressure so that the layer of secretion which covers the mucous membrane can be entirely removed and used for examination. In this manner it is possible to ascertain the existence of gonococcus when they are sparse or when they are deeply embedded in the mucous membrane.

The invention has further for its object to combine an instrument for taking secretion from the urethra with an instrument for taking secretion from the cervix, the two elements being removably connected the one with the other so that they can be easily separated for transportation.

An instrument according to the invention, is shown, by way of example, in the accompanying drawing in which:—

Fig. 1 shows an element designed for taking secretion from the urethra and an element for taking secretion from the cervix combined to form one instrument.

Fig. 2 shows the element for taking secretion from the cervix.

Fig. 3 shows the element designed for taking secretion from the urethra.

The elements $a$ (Fig. 3) has at one end a small spoon shaped cavity $b$ and is enlarged at the middle to form a handle $c$. The second element $e$ consists of a rod which has near its end a small spoon shaped cavity $f$. A sleeve like thickened end $d$ of the handle serves to receive the element $e$. The instrument can be used for taking secretion from the urethra and from the cervix without the necessity to disinfect the instrument after the secretion from the urethra or from the cervix has been taken, as is necessary when the platinum eye is used which, when it has been used to take one secretion has to be disinfected before the second secretion is taken from the same patient.

The improved instrument is very handy and made from nickel plated metal. It can be disinfected in suitable solutions (lysol, lysoform or the like). As the little spoons are only shallow the secretion can be well spread upon the object-carrier. If only a little quantity of secretion is in the spoon-shaped cavity it might be removed from this cavity by means of a platinum eye to be spread on the carrier. The new instrument can be easily taken to pieces to be carried in the pocket. The handle might be made in on piece with one of the elements or as a separate piece.

I claim:—

A diagnostic instrument for obtaining samples of secretion comprising a rod shaped element having at one end a flattened out portion said portion defining a somewhat flat shallow depression adapted to collect secretion without injury to tissues, and the other end being provided with a socket adapted to contain the butt end of a second rod said second rod being likewise provided with a flat shallow depression at its end remote from its butt end.

In testimony whereof I affix my signature.

DR. MED. EUGEN GUTTMANN.